(12) United States Patent
Gordon

(10) Patent No.: US 10,000,672 B1
(45) Date of Patent: Jun. 19, 2018

(54) SPRAY CAN WITH PRE-MIXED FIBERGLASS AND RESIN

(71) Applicant: Bevin Gordon, Brooklyn, NY (US)

(72) Inventor: Bevin Gordon, Brooklyn, NY (US)

( * ) Notice: Subject to any disclaimer, the term of this patent is extended or adjusted under 35 U.S.C. 154(b) by 335 days.

(21) Appl. No.: 14/962,119

(22) Filed: Dec. 8, 2015

(51) Int. Cl.
*C09J 11/04* (2006.01)
*C09J 9/00* (2006.01)
*C09J 135/04* (2006.01)

(52) U.S. Cl.
CPC .................. *C09J 11/04* (2013.01); *C09J 9/00* (2013.01); *C09J 135/04* (2013.01)

(58) Field of Classification Search
CPC ............. C09J 11/04; C09J 9/00; C09J 135/04
USPC ........................................................ 524/365
See application file for complete search history.

(56) References Cited

U.S. PATENT DOCUMENTS

| 5,039,017 A | 8/1991 | Howe |
| 5,443,211 A | 8/1995 | Young |
| 6,290,386 B1 | 9/2001 | Baumgarti |
| 7,114,664 B2 | 10/2006 | Gundersen |
| 2004/0245355 A1 | 12/2004 | Fettig |
| 2011/0297754 A1 | 12/2011 | Valdez |

FOREIGN PATENT DOCUMENTS

WO    WO2009075902 A1    6/2009

*Primary Examiner* — Angela C Scott
(74) *Attorney, Agent, or Firm* — Kyle A. Fletcher, Esq.

(57) ABSTRACT

The spray can with pre-mixed fiberglass and resin is a prepackaged application system for fiberglass, which can be used for repair or for new applications. The spray can with pre-mixed fiberglass and resin is a chemical formulation that contains a combination of fiberglass and resin that can be applied in a single coat or a multiple coat in a manner similar to applying paint through a spray paint can. The spray can with pre-mixed fiberglass and resin comprises fiberglass, a solvent, a resin, and a propellant.

20 Claims, 2 Drawing Sheets

SPRAY CAN WITH PRE-MIXED FIBERGLASS AND RESIN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of construction materials, more specifically, a fiberglass coating that can be applied by spray.

SUMMARY OF INVENTION

The spray can with pre-mixed fiberglass and resin is a prepackaged application system for fiberglass, which can be used for repair or for new applications. The spray can with pre-mixed fiberglass and resin is a chemical formulation that contains a combination of fiberglass and resin that can be applied in a single coat or a multiple coat in a manner similar to applying paint through a spray paint can.

These together with additional objects, features and advantages of the spray can with pre-mixed fiberglass and resin will be readily apparent to those of ordinary skill in the art upon reading the following detailed description of the presently preferred, but nonetheless illustrative, embodiments when taken in conjunction with the accompanying drawings.

In this respect, before explaining the current embodiments of the spray can with pre-mixed fiberglass and resin in detail, it is to be understood that the spray can with pre-mixed fiberglass and resin is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spray can with pre-mixed fiberglass and resin.

It is therefore important that the claims be regarded as including such equivalent construction insofar as they do not depart from the spirit and scope of the spray can with pre-mixed fiberglass and resin. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
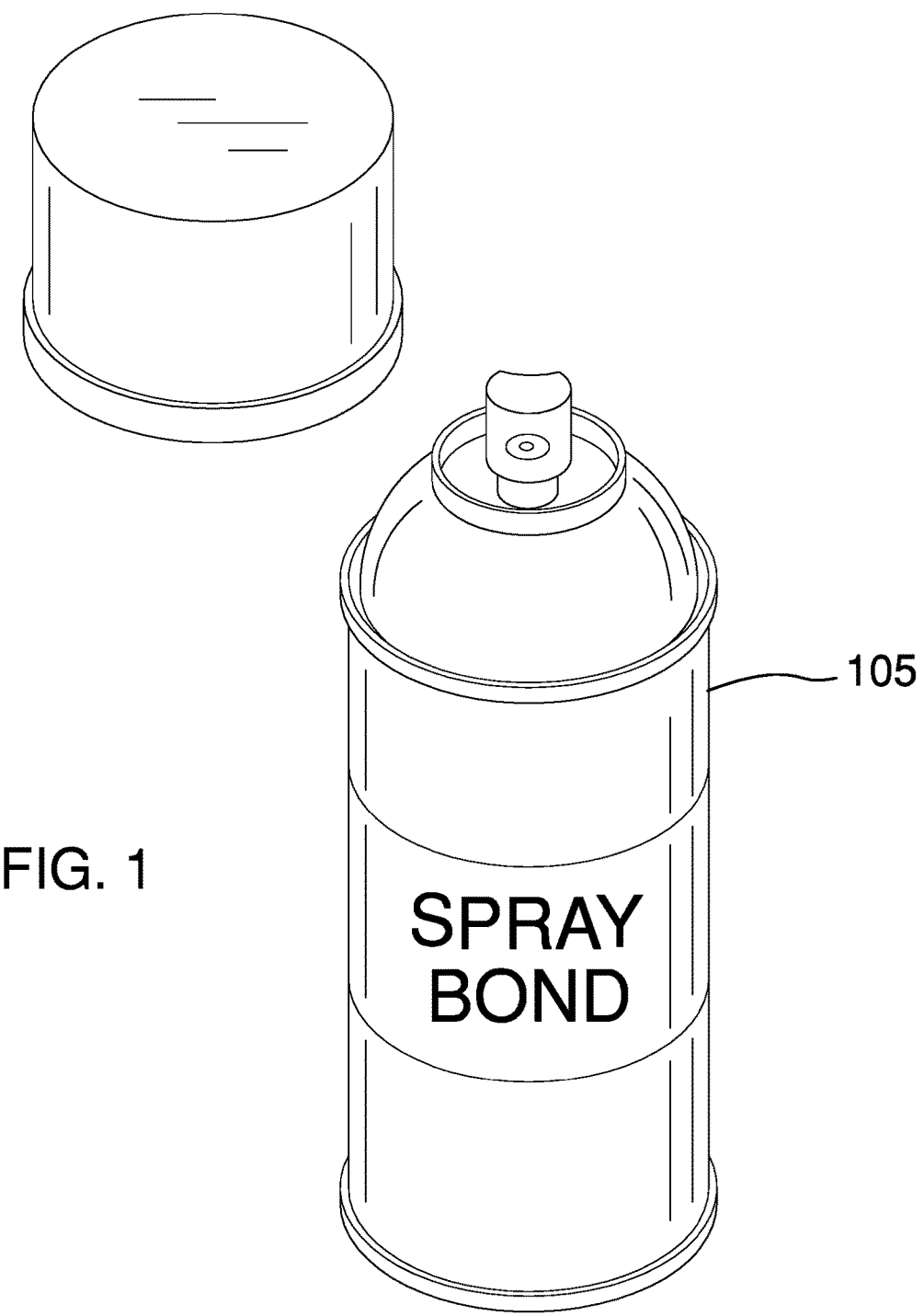
FIG. 1 is a perspective view of an embodiment of the disclosure.
Figure 2:
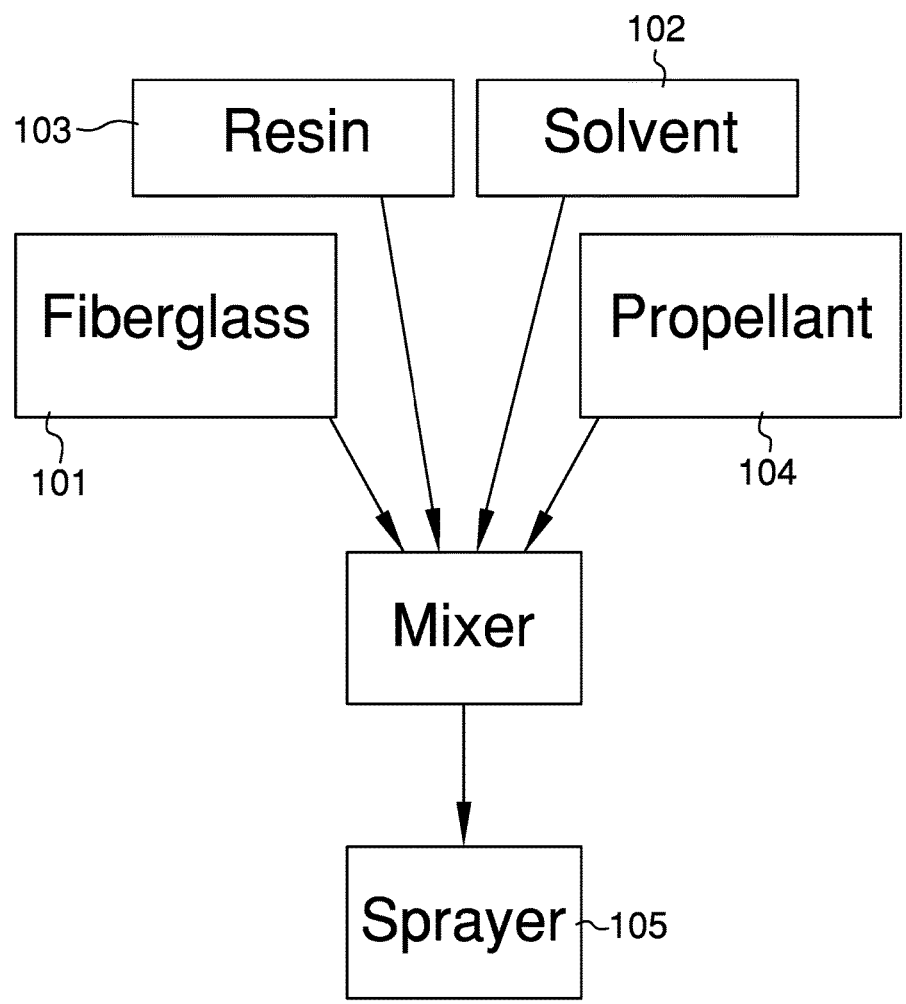
FIG. 2 is a block diagram of an embodiment of the disclosure.

Detailed reference will now be made to a first potential embodiment of the disclosure, which is illustrated in FIGS. 1 through 2. The spray can with pre-mixed fiberglass and resin 100 (hereinafter invention) comprises fiberglass 101, a solvent 102, a resin 103, and a propellant 104.

The fiberglass 101 and the resin 103 are initially dissolved in the solvent 102. The fiberglass 101 is formed by grinding commercially available fiberglass 101 into a powder. Alternatively, a commercially available silicate power can be used. The resin 103 is an acrylic based adhesive. A cyanoacrylate adhesive is preferred.

The solvent 102 is primarily ethanol. Depending on the type of chemical structure used to manufacture the fiberglass 101 sodium hydroxide, up to 30% (m/m), may be added to the ethanol to facilitate dissolution of the fiberglass 101. Depending on the resin 103 used methyethylketone, up to 2% (m/m) or methylisobutylketone, up to 3% (m/m) may be added to the ethanol to facilitate dissolution of the of the resin 103. It is preferred that, if used at all, water be less than 5% of the mass of the solution.

The solution of fiberglass 101 and resin 103 in the solvent 102 is distributed using a spray can 105. The propellant 104 is used to evacuate the solution of fiberglass 101 and resin 103 in the solvent 102 from the spray can 105. Suitable propellants include, but are not limited to dimethylether.

To use the invention 100, the solution of fiberglass 101 and resin 103 in the solvent 102, along with the propellant 104, is sprayed from the spray can 105 onto the target surface. The solution of fiberglass 101 and resin 103 in the solvent 102 is then left to dry. The volatile nature of the solvent 102 and propellant 104 will evaporate leaving behind the fiberglass 101 and resin 103 structure on the target surface.

With respect to the above description, it is to be realized that the optimum dimensional relationship for the various components of the invention described above and in FIGS. 1 through 2, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which as defined in the following claims. Accordingly, the invention will fall within the spirit and scope of the present invention is to be limited only by the scope of the following claims and their equivalents.

What is claimed is:

1. A prepackaged system comprising:
a chemical formulation;
wherein the prepackaged system is adapted for use as a construction material;
wherein the prepackaged system applies the chemical formulation through a spray can;
wherein the chemical formulation further comprises fiberglass, a resin, and a solvent.

2. The prepackaged system according to claim 1 wherein the fiberglass and resin are dissolved in the solvent.

3. The prepackaged system according to claim 2 wherein the fiberglass dissolved into the solvent is in powder form.

4. The prepackaged system according to claim 3 wherein the solvent comprises ethanol.

5. The prepackaged system according to claim 4 wherein the resin is an adhesive.

6. The prepackaged system according to claim 5 wherein the solvent further comprises sodium hydroxide.

7. The prepackaged system according to claim 6 wherein the concentration of sodium hydroxide in the solution is less than 31% (m/m).

8. The prepackaged system according to claim 5 wherein the resin is a cyanoacrylate based adhesive.

9. The prepackaged system according to claim 8 wherein the solvent further comprises sodium hydroxide.

10. The prepackaged system according to claim 9 wherein the concentration of sodium hydroxide in the solution is less than 31% (m/m).

11. The prepackaged system according to claim 10 wherein the solvent further comprises methylethylketone.

12. The prepackaged system according to claim 11 wherein the concentration of methylethylketone in the solvent is less than 2% (m/m).

13. The prepackaged system according to claim 12 wherein the solution of fiberglass and resin in the solvent is distributed using a spray can.

14. The prepackaged system according to claim 13 wherein the propellant is used to evacuate the solution of fiberglass and resin in the solvent from the spray can is dimethylether.

15. The prepackaged system according to claim 10 wherein the solvent further comprises methylisobutylketone.

16. The prepackaged system according to claim 15 wherein the concentration of methylisobutylketone in the solvent is less than 4% (m/m).

17. The prepackaged system according to claim 16 wherein the solution of fiberglass and resin in the solvent is distributed using a spray can.

18. The prepackaged system according to claim 17 wherein the propellant is used to evacuate the solution of fiberglass and resin in the solvent from the spray can is dimethylether.

19. The prepackaged system according to claim 10 wherein the solution of fiberglass and resin in the solvent is distributed using a spray can.

20. The prepackaged system according to claim 19 wherein the propellant is used to evacuate the solution of fiberglass and resin in the solvent from the spray can is dimethylether.

* * * * *